Nov. 2, 1954　　C. K. HOOPER　　2,693,566
PROTECTIVE SYSTEM
Filed Oct. 29, 1949

WITNESSES:
E.G. McCloskey
New. G. Groome

INVENTOR
Charles K. Hooper.
BY
F. E. Browder
ATTORNEY

United States Patent Office 2,693,566
Patented Nov. 2, 1954

2,693,566

PROTECTIVE SYSTEM

Charles K. Hooper, Linthicum Heights, Md., assignor to Westinghouse Electric Corporation, East Pittsburgh, Pa., a corporation of Pennsylvania Application October 29, 1949, Serial No. 124,433

5 Claims. (Cl. 321—12)

This invention relates to tube rectifiers, such as the well-known high vacuum or gaseous tube type, and in particular relates to an arrangement for protecting such rectifiers from arc back or reverse current flow.

An object is to provide an improved protective system for tube rectifiers.

Rectifiers, of the high vacuum or gaseous type, are unidirectional current conducting devices in that electron flow is normally only in the direction from the cathode to one or more anodes. The cathode may be a hot filament, either directly or indirectly heated, or it may be a mercury pool emitting electrons from a cathode hot spot. Under abnormal conditions, however, electrons may be caused to flow toward the cathode. Such abnormal conditions may be due to excessive voltage, improper gas density within the tube, or impurities in the electrode or other parts of the tube. If electron flow toward the cathode is allowed to continue for any appreciable length of time, this reverse current flow or arc back may reach an excessive value and damage the rectifier tube or other electrical apparatus in the circuit with the tube. Since abnormal conditions are expected to occur occasionally, in many applications it is desirable to be able immediately to detect reverse current flow or arc back through the tube and to promptly remove the source of power or limit the current flow.

Another object is to provide an improved system for protecting a rectifier tube or other apparatus in circuit with the rectifier tube from damage due to reverse current flow or arc back through the rectifier tube.

Another object is to provide an improved protective device which will disconnect a rectifier tube from its power source upon the occurrence of reverse current flow or arc back through the tube.

Another object is to provide an improved system for disconnecting a rectifier tube from a power source upon reverse current flow or arc back through the tube which comprises a separate rectifier for the reverse current.

Still another object is to provide an improved tube rectifier protective system which will disconnect apparatus from the rectifier tube circuit upon reverse current flow or arc back through the rectifier tube.

These and other objects are effected by my invention, as will be apparent from the following description and claims taken in connection with the accompanying drawing forming a part of this application, in which:

Figure 2:
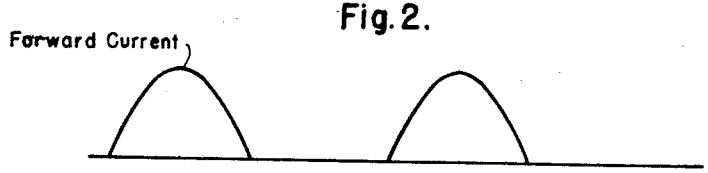
Fig. 2 is a graphical plot showing normal current flow through a rectifier tube.
Figure 3:
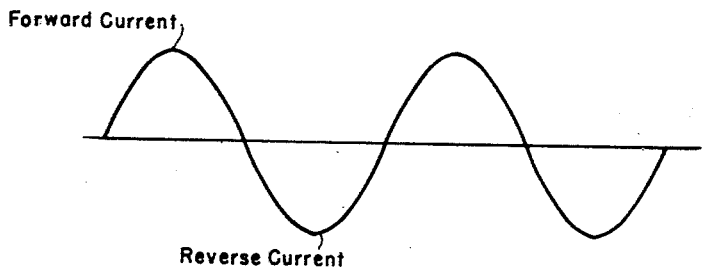
Fig. 3 is a graphical plot illustrating current flow through a rectifier tube when there is reverse current flow or arc back through the rectifier tube.

Referring in detail to Fig. 2, the exact wave shape of the output current from the rectifier tube is determined by the alternating current input voltage wave shape and the nature of the load connected to the rectifier tube. Regardless of its wave shape, however, the output current from the rectifier will never be negative as long as the rectifier tube functions in a normal manner. However, in case of reverse current flow or arc back through the rectifier tube, the current wave form will go negative. This condition is illustrated in Fig. 3. This invention provides a rectifier for detecting the difference in the wave shapes as shown in Figs. 2 and 3 and utilizes the difference to operate protective devices to remove the power from the rectifier tube or limit the reverse current flow through the tube.

Figure 1:
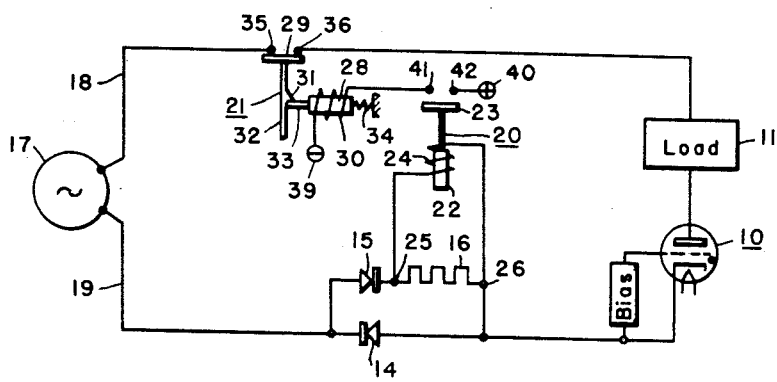
Fig. 1 is a schematic diagram of a rectifier circuit for making use of the principles of my invention.

Referring to Fig. 1, I illustrate a tube rectifier 10, which may be of the gaseous type or a high vacuum tube. It is well known in the art that tubes of these types are essentially unidirectional current conducting devices. A load 11, which may be any external apparatus, is connected in circuit with the tube 10. A rectifier 14, which passes current in the same direction as the rectifier tube 10, is connected in series with the tube 10. A circuit comprising another rectifier 15 and a serially connected resistor 16, is connected in shunt with the rectifier 14. The rectifier 15 passes current in the opposite direction from the rectifier 14. Alternating current power is supplied to the circuit including the rectifier tube 10 from some suitable source 17 by means of conductors 18 and 19. The rectifiers 14 and 15 may be small barrier layer units. The rectifier 14 must have a current carrying capacity equal to the normal direct current in the tube 10. The inverse voltage rating of the rectifier 15 may be extremely low. The resistor 16 is of low value. The rectifier 14 is so connected that normal current from tube 10 will flow through it. The rectifier 15 is connected to oppose the normal current flow through the tube 10. Therefore, under normal operating conditions practically all of the tube current is in the rectifier 14 and practically none in the rectifier 15. Consequently, there is substantially no voltage developed across the resistance 16 under normal operating conditions. If the tube 10 passes current in the reverse direction because of arc backs, however, the positive or normal conponent of current flow will continue in rectifier 14 whereas the reverse or negative component of current flow will be through rectifier 15. Therefore, under conditions of tube arc back, a substantial voltage drop appears across resistor 16. Because of the rectifying action of the rectifier 15, the voltage across resistance 16 will have a direct component, even though the total current in the tube 10 may be alternating without any direct component.

A relay 20 and a circuit breaker 21 are provided for opening the circuit from the power source 17 to the tube 10 upon arc-back or reverse current flow through the tube 10. The relay 20 comprises a movable armature 22 having a contact bridging member 23 and an operating coil 24. The operating coil 24 is connected across the resistance 16 at points 25 and 26.

The circuit breaker 21 comprises a movable armature 28 having a contact bridging member 29, and an operating or tripping coil 30. A lug 31 is provided on the stem 32 carrying the bridging member 29. An extension of the armature 28 is caused to engage under the lug 31 to lock the bridging member 29 in circuit closed position by a spring 34. The bridging member 29 opens or closes a pair of contacts 35 and 36 which are in the circuit between the power source 17 and the tube 10.

The tripping coil 30 serves to withdraw the extension 33 of the armature from under the lug 31 and permit the bridging member 29 to drop down by gravity and open the circuit including the contacts 35 and 36. The tripping coil 30 is supplied with potential from some suitable source (not shown) which is connected to terminals 39 and 40. The circuit between terminals 39 and 40 also includes a pair of contacts 41 and 42 which are opened or closed by the bridging member 23 of the relay 20.

Fig. 1 illustrates the condition of the circuit when the tube 10 is conducting current in the normal manner, as illustrated by the graph of Fig. 2. When the tube 10 conducts current in the reverse direction, as illustrated in Fig. 3, the rectifier 15 carries this reverse current and a potential is developed across the resistor 16. This potential energizes the coil 24 of the relay 20 and causes the armature 22 to move upward until the bridging member 23 closes the contacts 41 and 42 in the circuit breaker tripping coil 30. Closing of the contacts 41 and 42 energizes the circuit breaker tripping coil 30 which causes the armature extension 33 to be withdrawn from under the lug 31. When the armature extension is withdrawn from under the lug 31, the bridging member 29 drops down and opens the contacts 35 and 36 and disconnects the power source 17 from the tube 10. Once the circuit breaker 21 has been opened by reverse current flow in the tube 10 or other abnormal conditions in the circuit it remains open until manually reclosed.

This protective system is very rapid in its action as it requires no moving parts except the armatures of the relay 20 and the circuit breaker 21. The tube 10 may stand an arc back of 1/10 of a second duration before it is injured. However, voltage developed across the resistance 16 due to reverse current flow or arc back through the tube 10 is practically instantaneous. Therefore, any delay in opening the circuit to the tube 10 is very small, since it requires a very short time for sufficient field to build up in the relay 20 to move the armature and raise the bridging member 23 and close the contacts 41 and 42 to energize the tripping coil 30 of the circuit breaker 21. Opening of the circuit breaker 21 is substantially instantaneous with energization of the tripping coil 30.

From the foregoing description taken in connection with the drawing, it is seen that this invention provides a simple and effective protective device for a tube rectifier upon the occurrence of reverse current flow or arc back in the rectifier tube.

While I have shown my invention in but one form, it will be obvious to those skilled in the art that it is not so limited, but is susceptible of various changes and modifications without departing from the spirit thereof, and I desire, therefore that only such limitations shall be placed thereupon as are specifically set forth in the appended claims.

I claim as my invention:

1. In combination, a rectifier tube, a source of power connected to said tube, a second rectifier of the same polarity as said tube in series with said tube, a third rectifier of opposite polarity in shunt with said second rectifier, and a device responsive to the current flow in said third rectifier upon reverse current flow in said tube to substantially instantaneously terminate said reverse current flow in said tube upon its occurrence.

2. In combination, a rectifier tube, a source of power connected to said tube, a second rectifier of the same polarity as said tube in series with said tube, a third rectifier of opposite polarity in shunt with said second rectifier, and a device responsive to the current flow in said third rectifier upon reverse current flow in said tube for substantially instantaneously disconnecting said power source from said tube upon the occurrence of reverse current flow in said tube.

3. In combination, a rectifier tube, a source of power connected to said tube, a second rectifier of the same polarity as said tube in series with said tube and said power source, a third rectifier of opposite polarity in shunt with said second rectifier, an impedance in series with said third rectifier, and a device responsive to the potential across said impedance due to current from said third rectifier flowing in said impedance upon reverse current flow in said tube for substantially instantaneously disconnecting said power source from said tube upon the occurrence of reverse current flow in said tube.

4. In combination, a rectifier tube, a source of power connected to said tube, a second rectifier of the same polarity as said tube in series with said tube and said power source, a third rectifier of opposite polarity in shunt with said second rectifier, an impedance in series with said third rectifier, a coil connected across said impedance, a circuit interrupter operated by said coil in response to potential developed across said impedance due to current flow through said third rectifier upon reverse current flow in said tube to substantially instantaneously interrupt the circuit connecting said power source to said tube upon the occurrence of reverse current flow in said tube.

5. In combination, a rectifier tube, a source of power connected to said tube, a second rectifier of the same polarity as said tube in series with said tube, a third rectifier of opposite polarity in shunt with said second rectifier, and a device responsive to current flow in said third rectifier upon reverse current flow in said tube for substantially instantaneously indicating reverse current flow in said tube upon the occurrence of reverse current flow in said tube.

References Cited in the file of this patent

UNITED STATES PATENTS

| Number | Name | Date |
|---|---|---|
| 1,817,084 | Keller | Aug. 4, 1931 |
| 2,057,531 | Livingston | Oct. 13, 1936 |
| 2,101,207 | Williamson | Dec. 7, 1937 |
| 2,169,866 | Bedford | Aug. 5, 1939 |
| 2,275,881 | Bany | Mar. 10, 1942 |
| 2,381,527 | Traver | Aug. 7, 1945 |